United States Patent
Timmins et al.

(10) Patent No.: US 7,811,093 B2
(45) Date of Patent: Oct. 12, 2010

(54) TELECOMMUNICATIONS CONNECTIVITY SYSTEM

(75) Inventors: Ian J. Timmins, Asheville, NC (US); Derrick F. Stikeleather, Swananoa, NC (US); William B. Everette, Asheville, NC (US); Sterling Vaden, Black Mountain, NC (US); Sumio Seo, Wallingford, VT (US); Lyudmila Z. Burtseva, Asheville, NC (US); James Yanik, Asheville, NC (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 12/700,240

(22) Filed: Feb. 4, 2010

(65) Prior Publication Data

US 2010/0136810 A1    Jun. 3, 2010

Related U.S. Application Data

(60) Division of application No. 12/220,357, filed on Jul. 23, 2008, now Pat. No. 7,690,921, which is a continuation-in-part of application No. 11/517,826, filed on Sep. 8, 2006, now Pat. No. 7,448,875.

(51) Int. Cl.
*H01R 29/00* (2006.01)
*H02B 1/56* (2006.01)
(52) U.S. Cl. ........................................ 439/49
(58) Field of Classification Search ............. 439/49, 439/540.1, 490; 379/326–329
See application file for complete search history.

(56) References Cited

U.S. PATENT DOCUMENTS

| | | |
|---|---|---|
| 5,145,380 A | 9/1992 | Holcomb et al. |
| D359,475 S | 6/1995 | Coffey |
| 5,575,665 A | 11/1996 | Shramawick et al. |
| 5,647,763 A | 7/1997 | Arnold et al. |
| 5,944,535 A | 8/1999 | Bullivant et al. |
| D416,908 S | 11/1999 | Whisenant |
| 6,017,229 A | 1/2000 | Tulley et al. |
| 6,075,784 A | 6/2000 | Frankel et al. |
| 6,109,959 A | 8/2000 | Burlinson et al. |
| 6,350,147 B2 | 2/2002 | Brownell et al. |

(Continued)

FOREIGN PATENT DOCUMENTS

WO    WO 2005/104567 A1    11/2005

OTHER PUBLICATIONS

PCT International Search Report; PCT/US2007/077876; dated Feb. 14, 2008.

*Primary Examiner*—Javaid Nasri
(74) *Attorney, Agent, or Firm*—Carter, Schnedler & Warnock

(57) ABSTRACT

A telecommunications connectivity system including a patch panel comprising a plurality of ports, each port including first and second electrical terminals, the first electrical terminal enabling at least one data communications standard not enabled by the second electrical terminal. The telecommunications connectivity system also includes a terminal selection system including a terminal selector that houses an electrical connector. The terminal selector may be installed in one of the ports such that the electrical connector connects to either the first or second electrical terminal, as preselected. The telecommunications connectivity system also includes a wall receptacle system electrically connected to each of the ports, the wall receptacle system including first and second jacks, the first jack enabling at least one data communications standard not enabled by the second jack.

7 Claims, 13 Drawing Sheets

U.S. PATENT DOCUMENTS

| | | |
|---|---|---|
| 6,755,664 B2 | 6/2004 | Sakamoto et al. |
| 6,826,280 B1 | 11/2004 | Sajedi et al. |
| 6,853,637 B1 | 2/2005 | Norrell et al. |
| 6,934,278 B1 | 8/2005 | Champa et al. |
| 6,993,011 B1 | 1/2006 | Kaplan et al. |
| 7,448,875 B2 * | 11/2008 | Timmins et al. ............. 439/49 |
| 7,690,921 B2 * | 4/2010 | Timmins et al. ............. 439/49 |
| 2005/0220059 A1 | 10/2005 | DelRegno et al. |

* cited by examiner

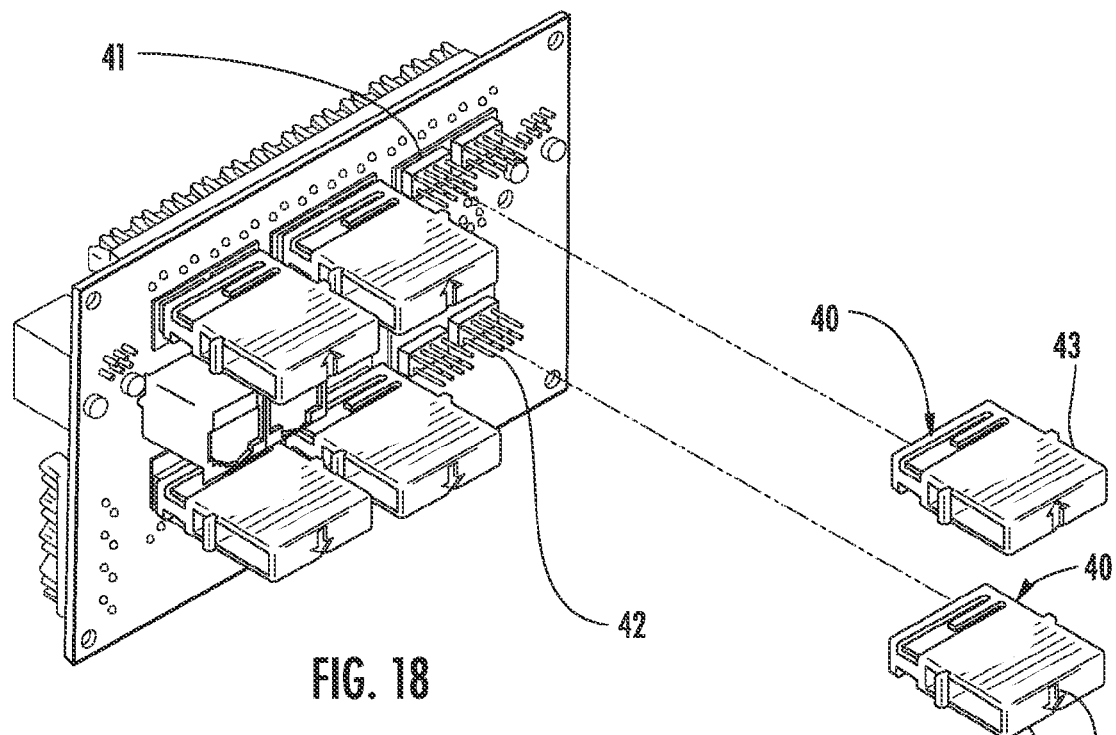
FIG. 18
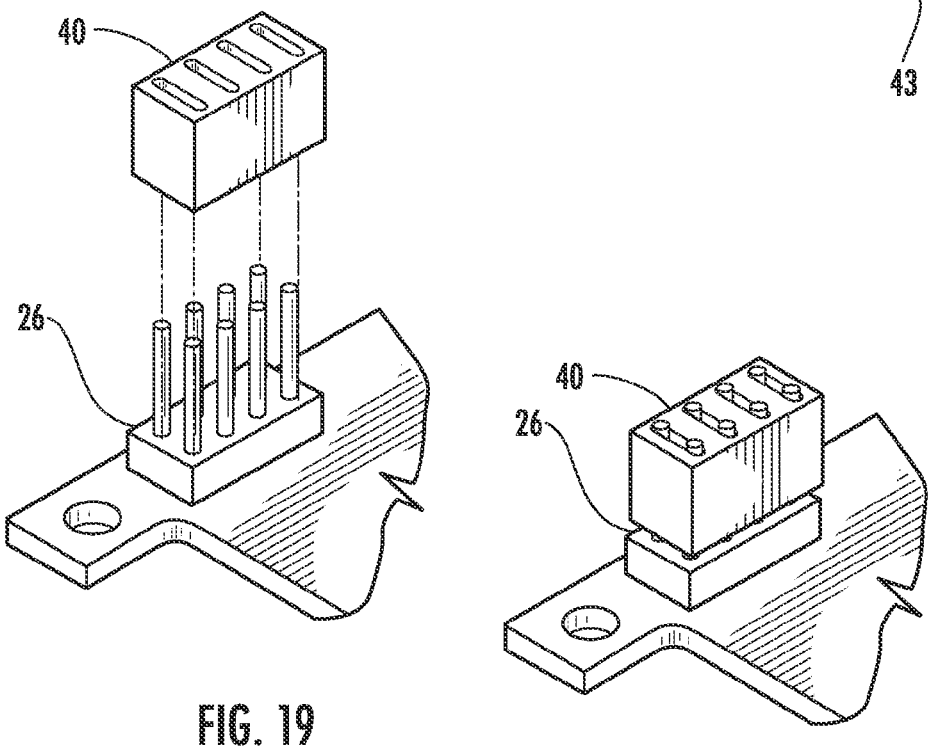
FIG. 19
FIG. 20

TELECOMMUNICATIONS CONNECTIVITY SYSTEM

CROSS-REFERENCE TO RELATED APPLICATIONS

This is a divisional of application Ser. No. 12/220,357 filed on Jul. 23, 2008 now U.S. Pat. No. 7,690,921 which is a continuation-in-part of application Ser. No. 11/517,826 filed on Sep. 8, 2006, now U.S. Pat. No. 7,448,875, and are hereby incorporated by reference into this application.

BACKGROUND OF THE INVENTION

This invention relates to telecommunications connectivity systems. More particularly it relates to a telecommunications connectivity system, including a patching system and a wall receptacle system.

SUMMARY OF THE INVENTION

In accordance with one form of this invention, there is provided a telecommunications connectivity system, including a patch panel having a plurality of ports. Each port includes first and second electrical terminals. The first electrical terminal enables at least one data communication standard not enabled by the second electrical terminal. A terminal selection system is provided and includes a terminal selector that houses an electrical connector wherein the terminal selector may be installed in one of the ports such that the electrical connector connects to either the first or second terminals as pre-selected. A wall receptacle system is provided and is electrically connected to each of the ports. The wall receptacle system includes first and second jacks with the first jack enabling at least one data communication standard not enabled by the second jack.

BRIEF DESCRIPTION OF THE DRAWINGS

FIG. 18 is a partially exploded anterior view of the patch panel printed circuit board of FIG. 3 showing the terminal selectors.

FIG. 19 is an exploded isometric view of a jumper and a header.

FIG. 20 is an isometric view of a jumper fully connected to a header.

DETAILED DESCRIPTION

The invention described and claimed herein encompasses a telecommunications connectivity system. An embodiment of the telecommunications connectivity system of the present invention includes (1) a patching system carrying a plurality of terminal selection systems, and (2) a wall receptacle system. The patching system is connected to the wall receptacle system by cable as commonly known to those skilled in the premise wiring art. As used herein, the term "telecommunications" includes the transmission of voice and/or data signals.

Figure 1:
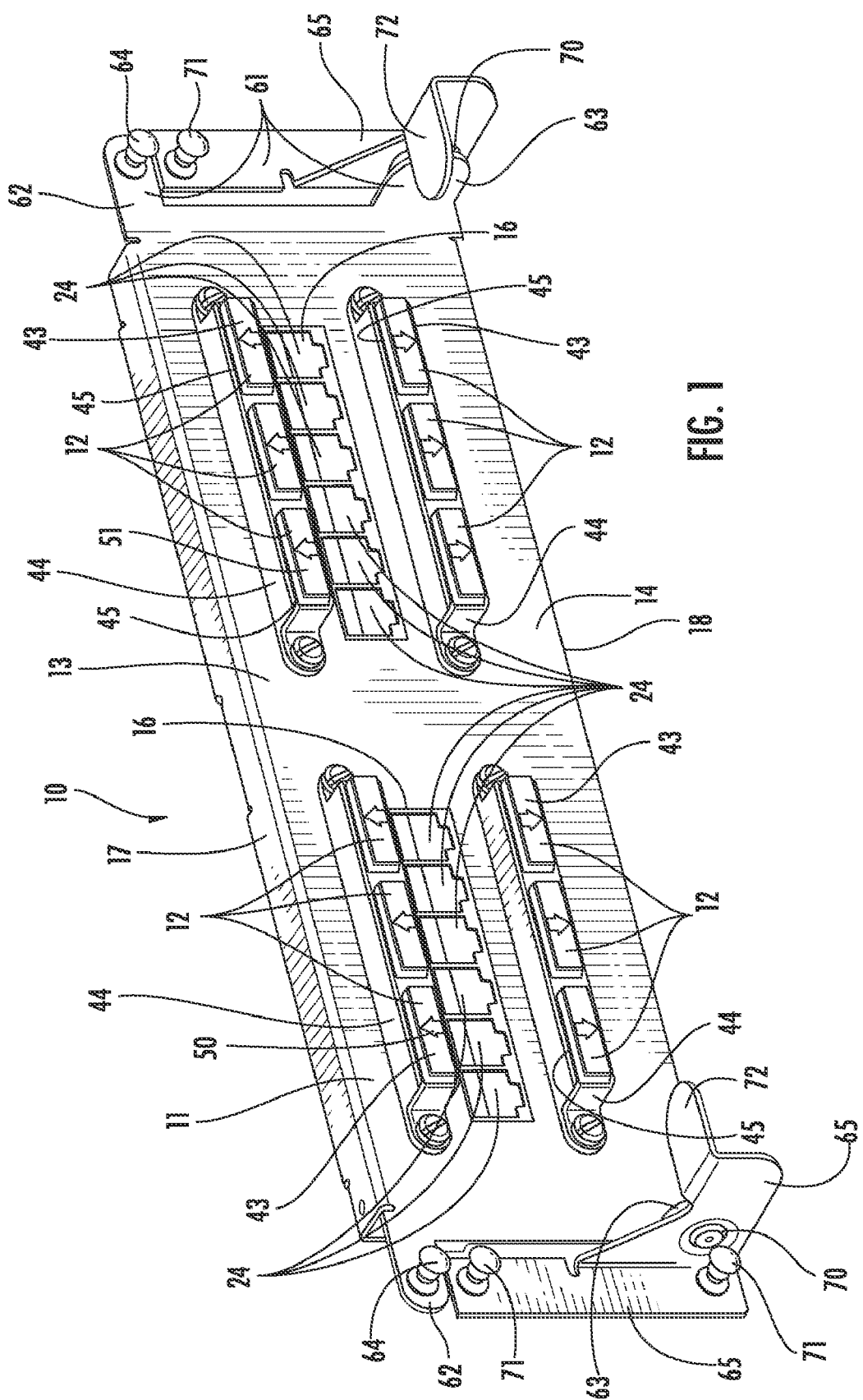
FIG. 1 is an anterior isometric view of a patching system according to an embodiment of the telecommunications connectivity system of the invention and a patch panel mounting system according to an embodiment of the invention.
Figure 2:
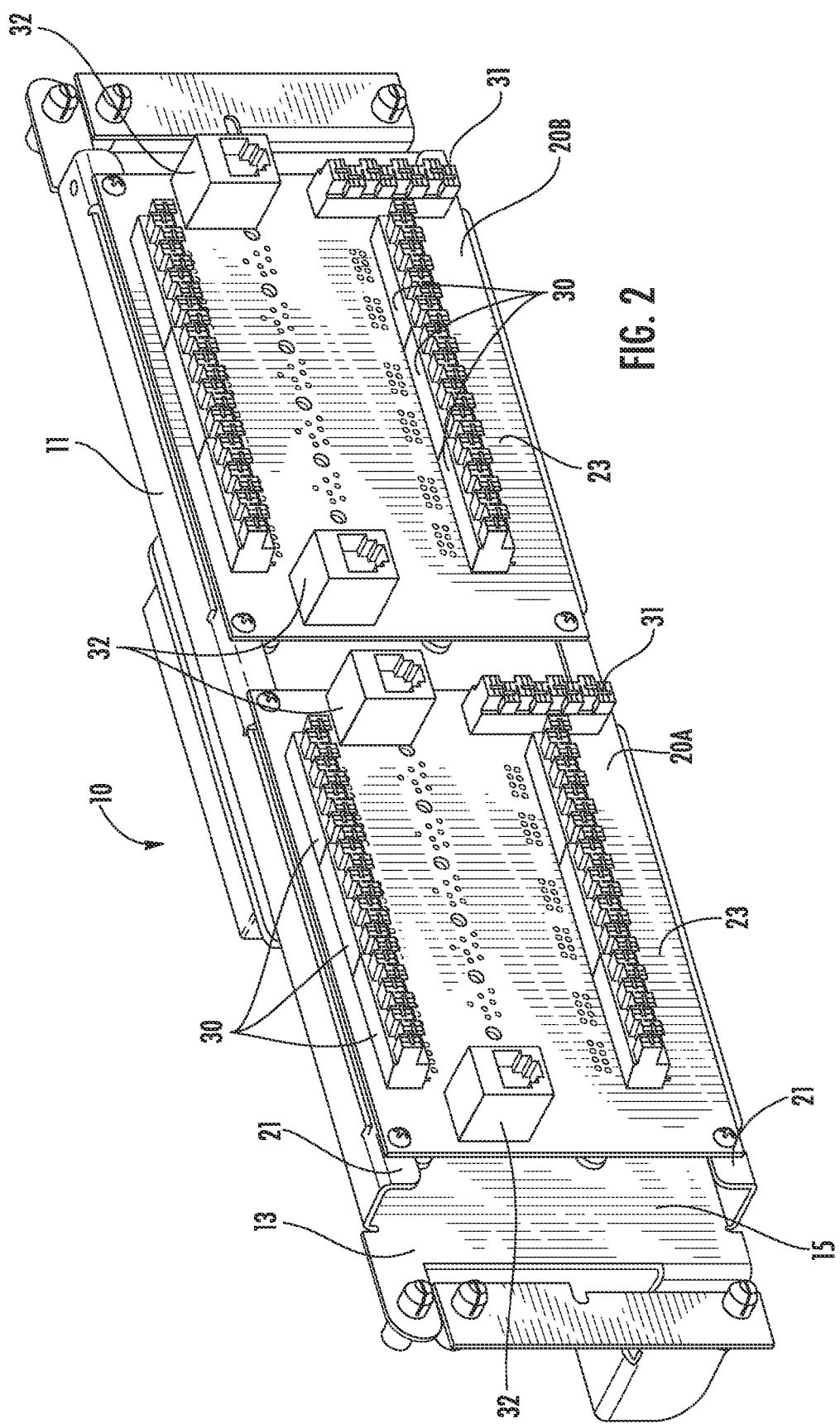
FIG. 2 is a posterior isometric view of the patching system and patch panel mounting system shown in FIG. 1.

A patching system according to the disclosed embodiment of the telecommunications connectivity system of the invention is shown broadly at reference numeral 10 in FIG. 1. The patching system 10 includes a patch panel 11 and a plurality of terminal selection systems 12. The patch panel 11 has substantially parallel upper and lower major edges 17, 18 and is comprised of a patch panel plate 13 with an anterior face 14 and a posterior face 15 (FIG. 2). The faceplate defines two large, substantially rectangular jack openings 16 (FIG. 1) and twelve small, substantially rectangular terminal selector terminals (obscured by terminal selection systems in FIG. 1). Three terminal selector openings are immediately above each of the two jack openings 16 and three terminal selector openings are immediately below each of the two jack openings 16.

Figure 3:
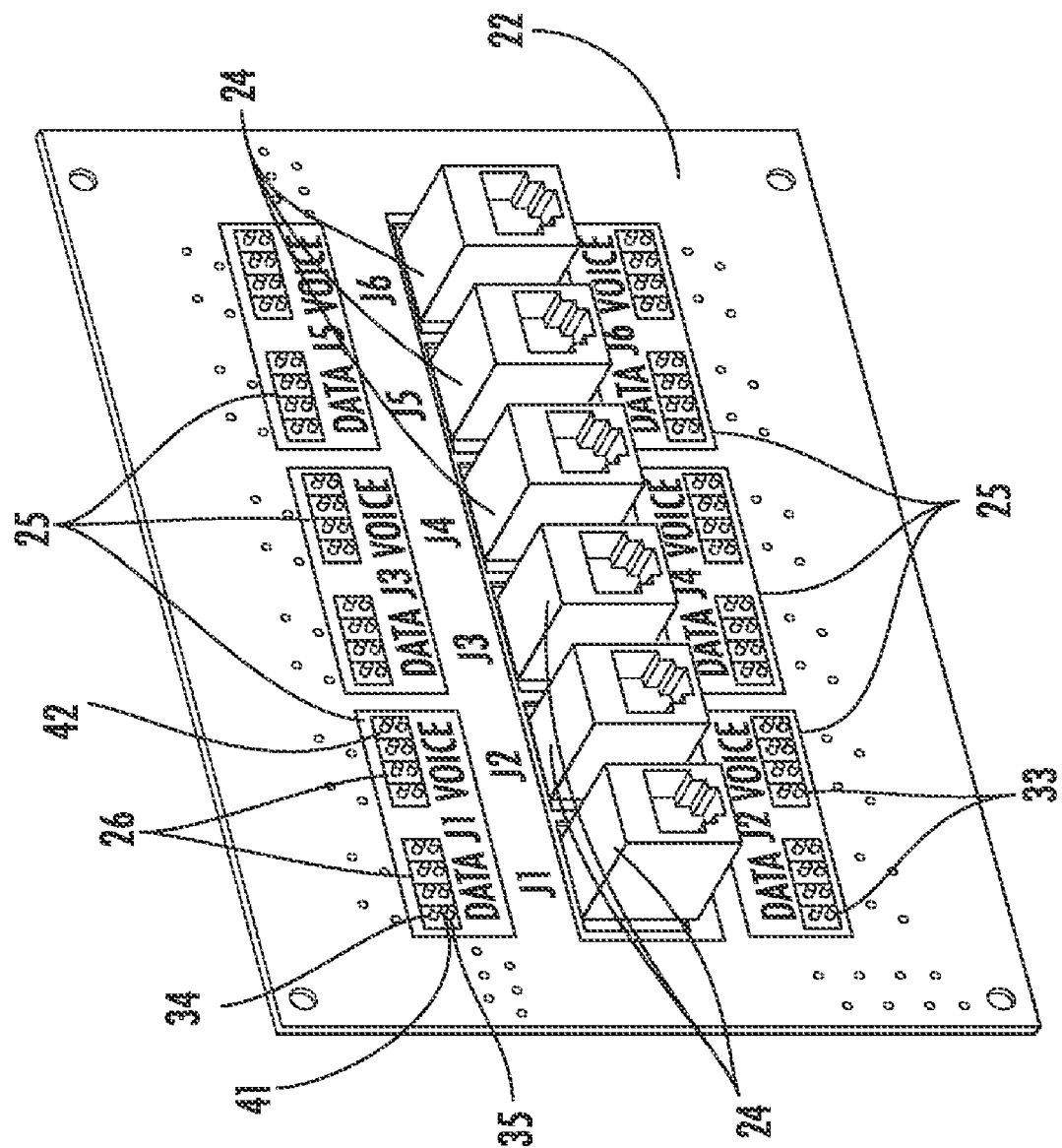
FIG. 3 is an anterior isometric view of a patch panel printed circuit board.

Two printed circuit boards 20A, 20B are mounted to rails 21 extending from the posterior face 15 of the plate 13. These printed circuit boards 20A, 20B are hereinafter sometimes referred to collectively as "panel PCBs" and individually as "a panel PCB." Each of the panel PCBs 20A, 20B has an anterior face 22 (FIG. 3) and a posterior face 23 (FIG. 2). Six eight-position, eight-conductor jacks 24 wired in accordance with the TIA T568A or T568B standard are mounted to the anterior face 22 of each panel PCB 20A, 20B. These jacks 24 hereinafter sometimes referred to collectively as "panel jacks" and individually as a "panel jack."

Figure 17:
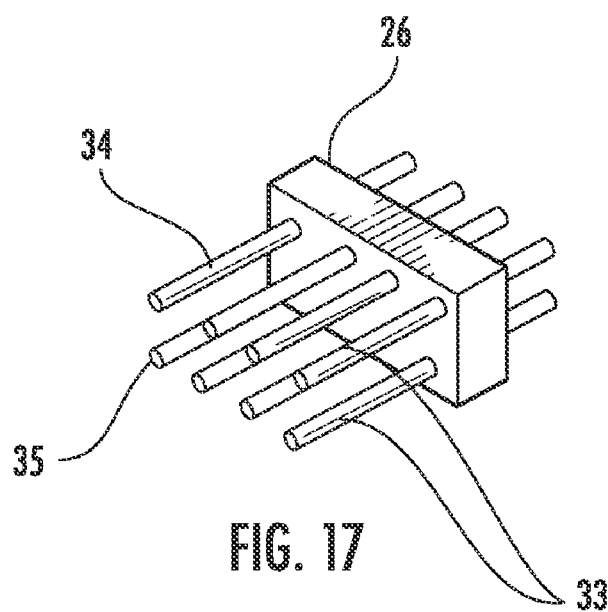
FIG. 17 is an anterior isometric view of a pin block which may be used with the patching system and the wall receptacle system of the subject invention.

Also mounted on the anterior face 22 of each panel PCB 20A, 20B are six pairs 25 of electrical terminals 26; in the disclosed embodiment of the invention these terminals are eight-pin headers 26 as shown in FIG. 17. These terminals 26 are hereinafter sometimes referred to collectively as "panel terminals" and individually as "a panel terminal," and the pairs 25 of panel terminals 26 are hereinafter sometimes referred to collectively as "panel terminal pairs" and individually as "a panel terminal pair." Each jack 24 and panel terminal pair 25 is electrically connected to an insulation displacement punchdown block 30 (FIG. 2) mounted on the posterior face 23 of the panel PCB 20A, 20B. These punchdown blocks 30 are hereinafter sometimes referred to collectively as the "panel IDCs" and individually as "the panel IDC."

An additional insulation displacement punchdown block 31 is mounted on the posterior face 23 of each panel PCB 20A, 20B to receive cabling (not shown) over which plain old telephone service ("POTS") is provided. This punchdown block 31 is hereinafter referred to as "the telco IDC." Finally, two RJ11 jacks 32 are mounted on the posterior face 23 of each panel PCB 20A, 20B and electrically connected to the telco IDC 31. These RJ11 jacks 32 enable panel PCBs 20A, 20B that are not directly connected to POTS to receive POTS communications. For instance, POTS may be directly connected to the telco IDC 31 of a first panel PCB 20A of the two panel PCBs 20A, 20B in the patch panel 11 and a length of cabling that terminates in RJ11 plugs at both ends (not shown) may then connect one of the RJ11 jacks 32 on the first panel PCB 20A to one of the RJ11 jacks 32 on the second panel PCB 20B of the two panel PCBs 20A, 20B, thereby extending POTS to the second panel PCB 20B.

Each panel jack 24 and its corresponding panel terminal pair 25, panel IDC 30, and four conductor pairs (not shown) are hereinafter referred to collectively as a "panel port." The four conductor pairs in each panel port are wired in accordance with the TIA T568A or TIA T568B standard. Thus, if data communications through the panel port are in accordance with the 10 megabit-per-second ("Mbps") and 100 Mbps standards (collectively "10/100"), conductor pair 1 carries voice communications over POTS, conductor pairs 2 and 3 carry data communications, and conductor pair 4 provides a secondary voice communications line over POTS. If data communications through the panel port are in accordance with the 1000 Mbps or "gigabit" standard, all four conductor pairs carry data communications and no voice communications occur.

Figure 10:
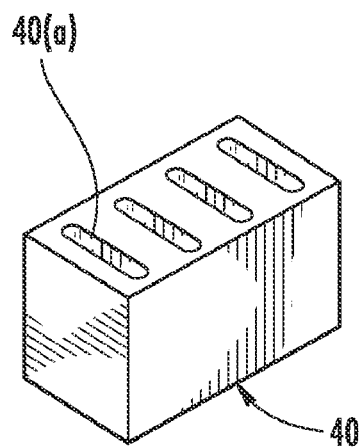
FIG. 10 is an isometric view of the jumper which may be used with the embodiments of the patching system shown in FIG. 4 and the wall receptacle system shown in FIG. 6 and FIG. 11.
Figure 11:
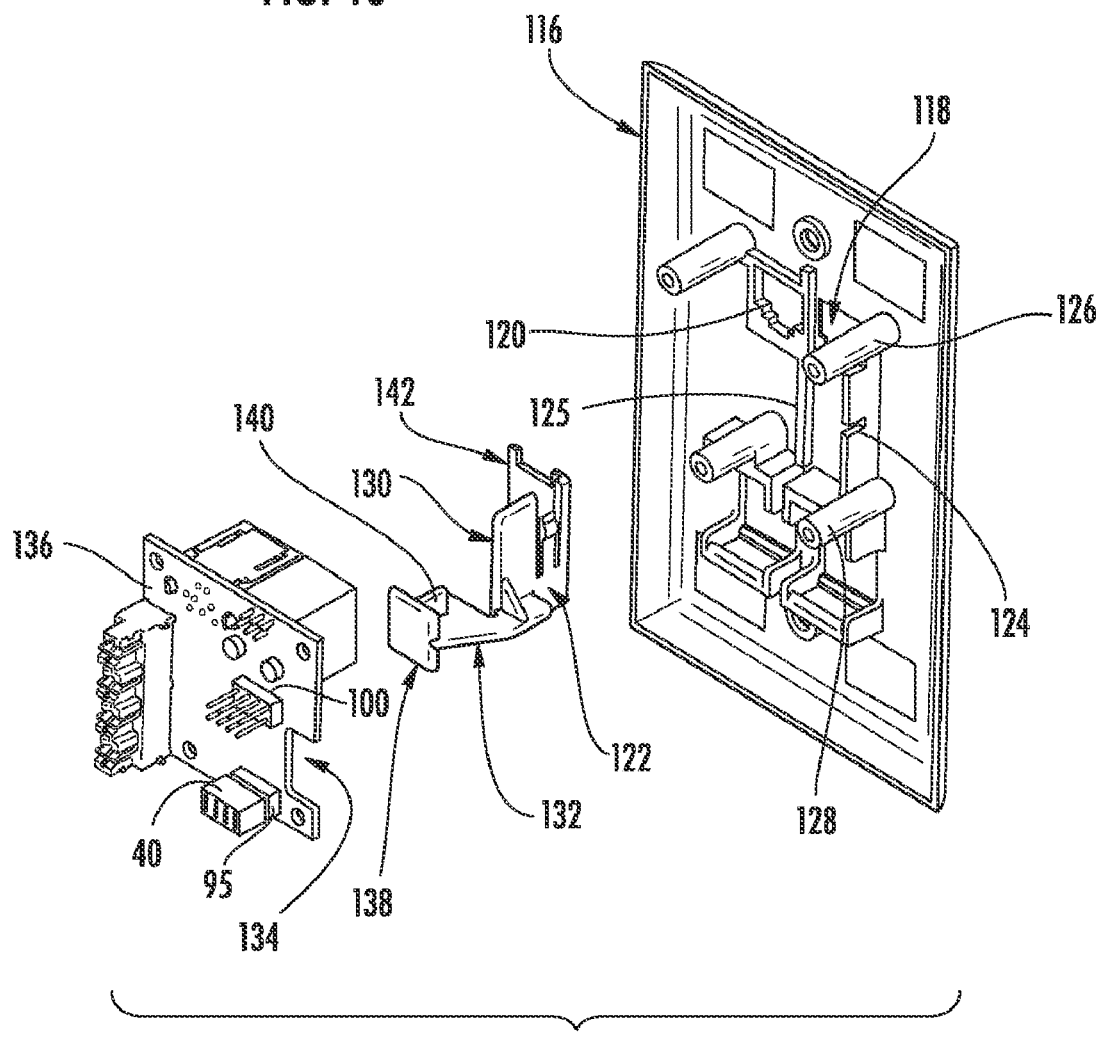
FIG. 11 is a posterior exploded view of an alternative embodiment of the wall receptacle system shown in FIGS. 6-8.
Figure 12:
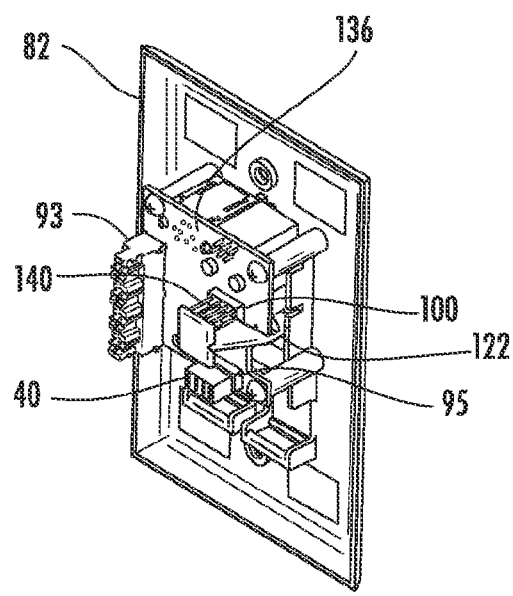
FIG. 12 is a fully assembled isometric posterior view of the wall receptacle system of FIG. 11 in the gigabit position.

In the disclosed embodiment of the invention, conductor pairs 2 and 3 in each panel port, along which data communications always occur, are hardwired. Thus, the panel terminal pairs 25 do not affect communications through conductor pairs 2 and 3. However, in each panel port, signal flow along conductor pairs 1 and 4 is interrupted by a panel terminal pair 25. In the disclosed embodiment of the invention, each panel terminal or header 26 in each panel terminal pair 25 has eight pins 33, two pins 33 for each conductor in conductor pairs 1 and 4. Signal flow may occur through a panel terminal 26 if the top row 34 of four pins 33 on the panel terminal 26 are electrically connected to the bottom row 35 of four pins 33 on the panel terminal 26 such that each pin 33 in the top row 34 is connected to the pin 33 immediately below it in the bottom row 35. These connections may be achieved by an electrical connector such as a four-conductor jumper 40 shown in FIG. 4 and FIG. 10. Jumper 40 may be received in housing 43 which is also referred to as a terminal selector. Jumper 40 includes four elongated openings 40(a). Each opening 40(a) receives a metal contact for engaging two adjacent pins 33 from top row 34 and bottom row 35 in header 26 to, in effect, short circuit those adjacent pins so that electrical current will flow from one adjacent pin to the other. An installer or user chooses to apply the jumper 40 to the panel terminal 26 in each panel terminal pair 25 that corresponds to the speed standard of the data communications that will be flowing through the panel port. If the panel port needs to carry gigabit standard data communications, the jumper 40 is applied to the left-hand panel terminal 41 in the panel terminal pair 25, thereby utilizing conductor pairs 1 and 4 for data communications in conjunction with the data communications hardwired through conductor pairs 2 and 3. If the panel port needs to carry 10/100 standard data communications, the jumper 40 is applied to the right-hand panel terminal 42 in the panel terminal pair 25, thereby utilizing conductor pairs 1 and 4 for primary and secondary voice communications lines over POTS while 10/100 data communications are hardwired through conductor pairs 2 and 3.

Figure 4:
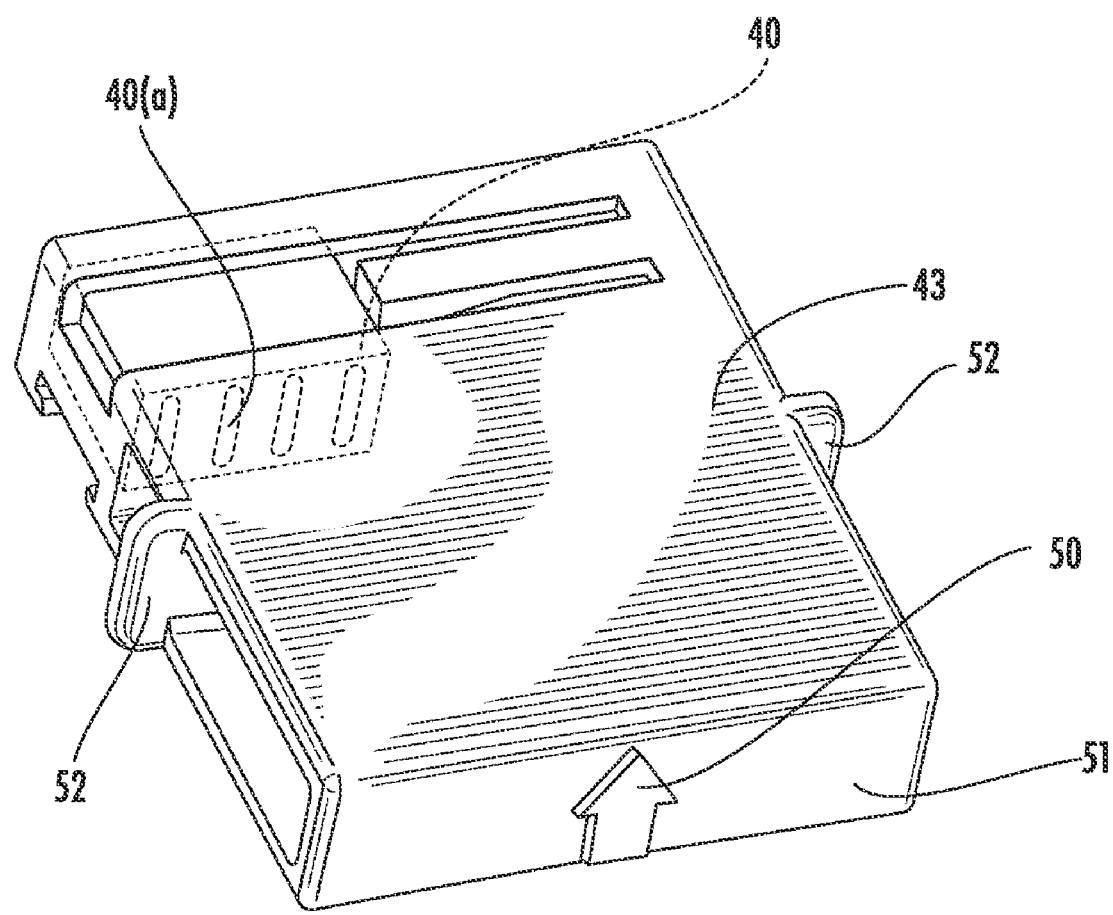
FIG. 4 is an anterior isometric view of a terminal selector according to an embodiment of the telecommunications connectivity system of the invention, with the jumper housed by the terminal selector shown in phantom.
Figure 5:
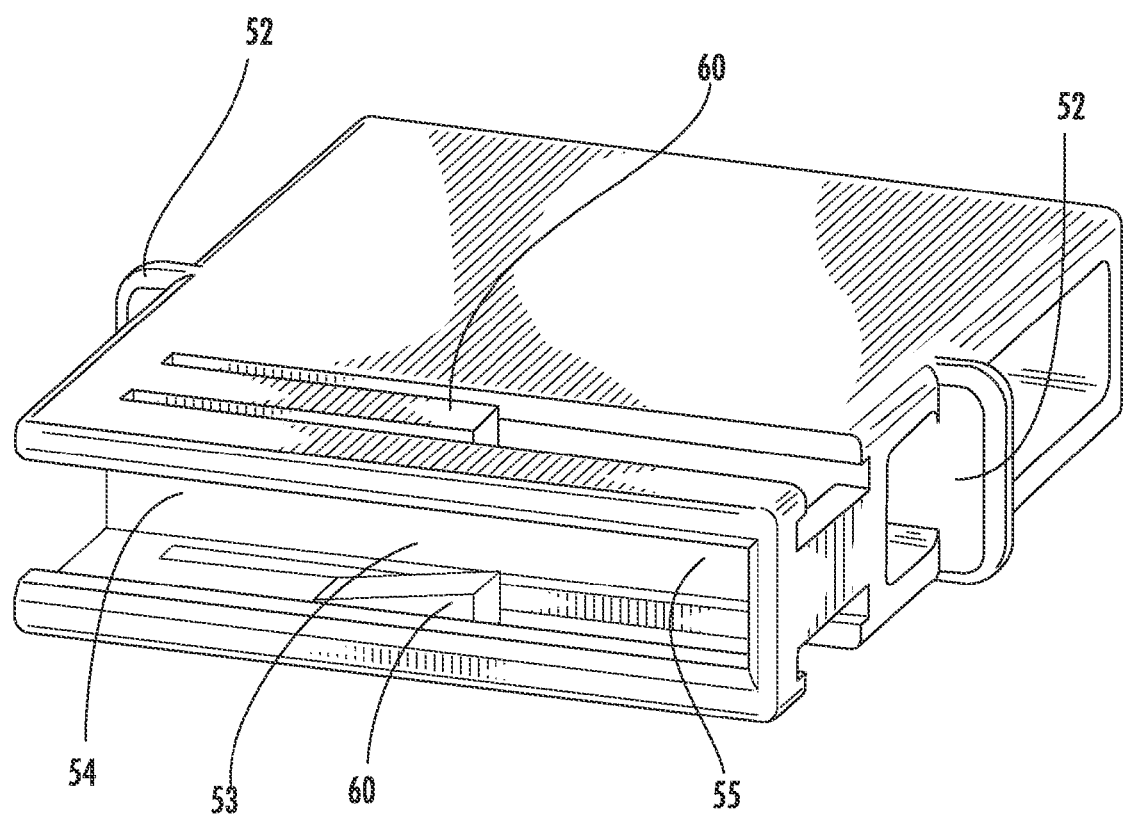
FIG. 5 is a posterior isometric view of the terminal selector shown in FIG. 4, with the jumper removed.

In the disclosed embodiment of the invention, the jumper 40 is a component of each terminal selection system 12. Each terminal selection system 12 may also comprise a terminal selector or housing 43 (FIGS. 1, 4, and 5) and a terminal selector guard 44 (FIG. 1). Each terminal selector 43 is a plastic housing for carrying the jumper 40. As shown in FIGS. 4 and 5, the terminal selector 43 comprises opposing protruding tabs 52. The tabs 52 are oriented such that, when the terminal selector 43 is installed and the terminal selector guard 44 is installed over the terminal selector 43, the tabs 52 and the terminal selector guard 44 prevent unintentional or unauthorized removal of the terminal selector 43 from the patch panel 11. The terminal selector 43 also defines an opening 53 (FIG. 5) for receiving the panel terminal pair 25. A shallow portion 54 of the opening 53 is configured to receive the panel terminal 26 that is not being engaged by the jumper 40, while a deep portion 55 of the opening 53 is configured to receive the jumper 40 and the panel terminal 25 engaging the jumper 40. Jumper stays 60 extend horizontally from the shallow portion 54 of the opening 53 toward the deep portion 55 of the opening 53 in order to keep the jumper 40 in place in the deep portion 55 of the opening 53. Each terminal selector guard 44 defines three openings 45 that, when the terminal selector guard 44 is installed, are in substantial alignment with the terminal selector openings in the faceplate 13 of the patch panel 11.

To be installed, each terminal selector 43 is inserted through the corresponding terminal selector opening in the faceplate 13 of the patch panel 11 until the jumper 40 in the terminal selector 43 fully engages one of the panel terminals 26 in the corresponding panel terminal pair 25 and the metal contacts in opening 40(a) receive a pair of pins 33 from header 26. The terminal selector guard 44 is then installed over the terminal selectors 43 in order to prevent unintentional or unauthorized removal of the terminal selectors 43 from the patch panel 11, as described above.

As illustrated in FIGS. 1 and 18, the terminal selector 43 may be in either of the two available horizontal positions depending on which panel terminal 26 in the panel terminal pair 25 is being selected relative to the corresponding jack 24 in the panel port. To assist with proper positioning of the terminal selector 43, a visual indicator such as an arrow 50 is provided on a readily visible surface 51 of the terminal selector 43. In the disclosed embodiment of the invention, if the terminal selector 43 is positioned such that the arrow 50 is pointing toward the upper major edge 17 of the patch panel 11, the terminal selector 43 and the jumper 40 housed therein are positioned to engage the left-hand panel terminal 41 in the panel terminal pair 25, which is configured to enable gigabit data communications, as described above. If the terminal selector 43 is positioned such that the arrow 50 is pointed toward the lower major edge 18 of the patch panel 11, the terminal selector 43 and the jumper 40 housed therein are positioned to engage the right-hand panel terminal 42 in the panel terminal pair 25, which is configured to enable 10/100 data communications together with voice communications, as described above.

Accompanying the patching system 10 is a patch panel mounting system 61 (FIG. 1). Specifically, the faceplate 13 of the patch panel 11 is provided with first and second pairs of ears 62, 63. The first pair of ears 62 is either attached to or integral with the faceplate 13 of the patch panel 11 at the corners of the faceplate 13 that are proximal to the upper major edge 17 of the patch panel 11. Each of the ears in the first pair of ears 62 defines a hole through which a fastener 64 is inserted. The fasteners 64 are configured to attach the first pair of ears 62 to a patch panel rack (not shown). The second pair of ears 63 are either attached to or integral with the faceplate 13 of the patch panel 11 at the corners of the faceplate 13 that are proximal to the lower major edge 18 of the patch panel 11. A bracket 65 is attached by hinges 70 to each of the ears in the second pair of ears 63. Each of the brackets 65 defines two spaced-apart holes through which fasteners 71 (three of four are visible in FIG. 1) are inserted. The fasteners 71 are configured to attach the brackets 65 to a patch panel rack. Each of the brackets 65 comprises a tab 72.

The patch panel mounting system 61 enables a user to access the posterior face 15 of the faceplate 13 of the patch plate and the posterior faces 23 of the panel PCBs 20A, 20B (FIG. 2) without removing the patch panel 11 from the patch panel rack (not shown). Specifically, a user may remove the fasteners 64 from the first pair of ears 62 of the faceplate 13 and, by virtue of the hinges 70, articulate the patch panel 11 away from the patch panel rack until the anterior face 14 of the faceplate 13 of the patch panel 11 rests against the tabs 72 of the brackets 65. After access to the posterior faces 15, 23 of the faceplate 13 and the panel PCBs 20A, 20B is no longer needed, the user may articulate the patch panel 11 back toward the patch panel rack and refasten the first pair of ears 62 of the faceplate 13 to the rack.

Figure 6:
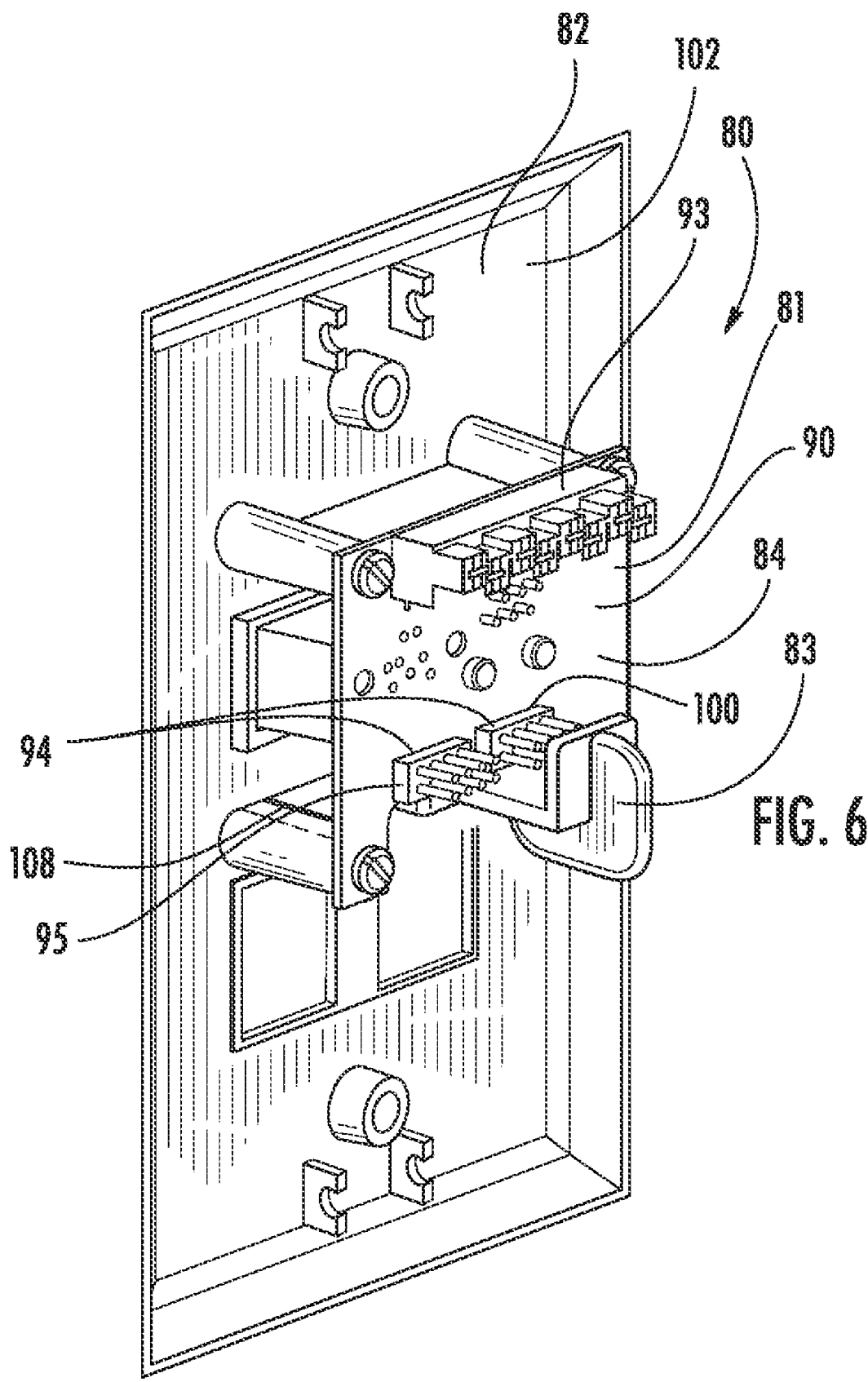
FIG. 6 is a posterior isometric view of a wall receptacle system in accordance with an embodiment of the telecommunications connectivity system of the invention.
Figure 7:
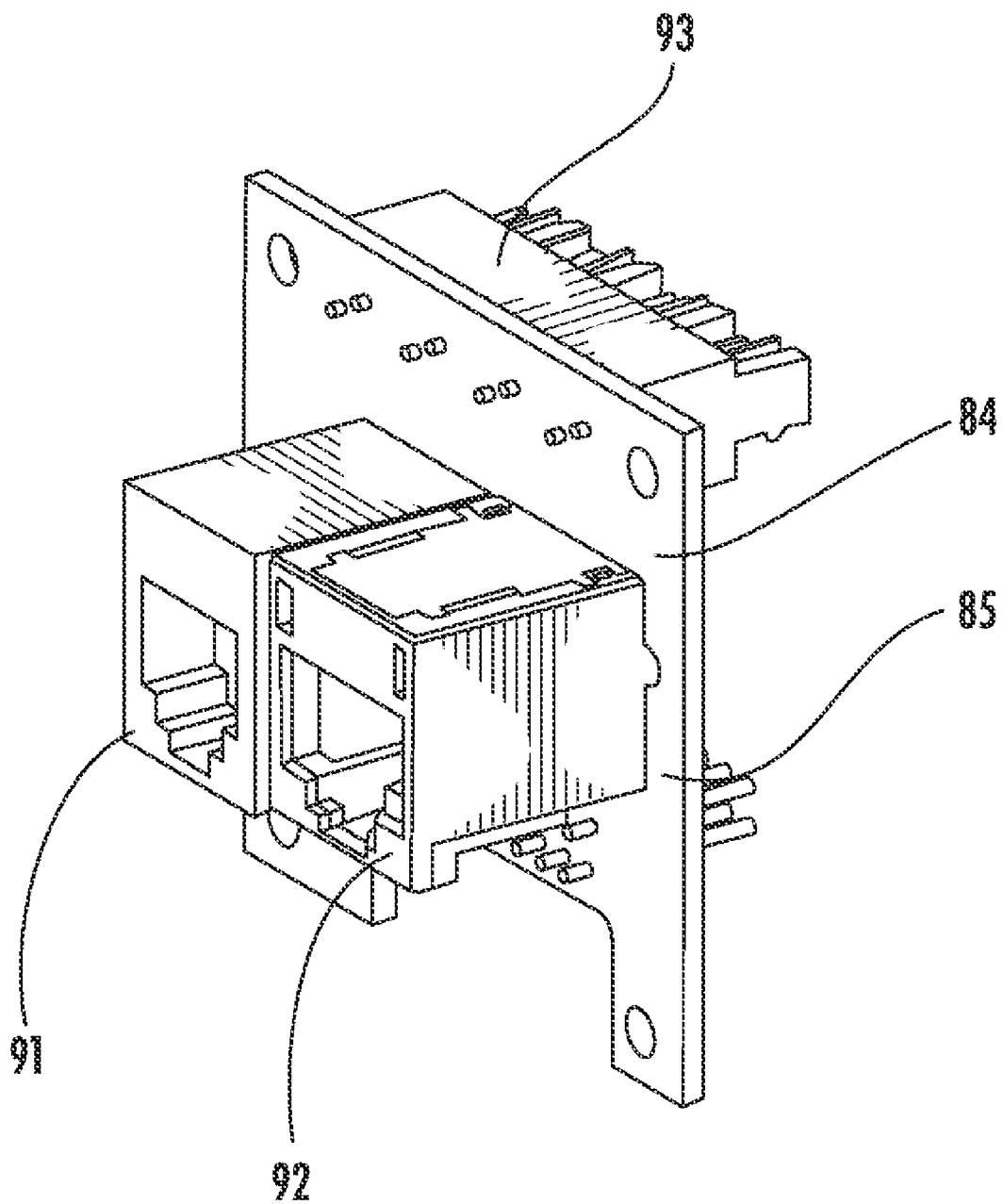
FIG. 7 is an anterior isometric view of a wall receptacle printed circuit board.

Turning now to FIG. 6, a wall receptacle system according to an embodiment of the telecommunications connectivity system of the invention is shown broadly at reference numeral 80. The wall receptacle system 80 cooperates with the patching system 10 and is adapted to be connected to the patching system 10 by a cabling system (not shown). The wall receptacle system 80 includes a jack assembly 81, a wall receptacle faceplate 82, and a shutter 83. The jack assembly 81 is attached to the wall receptacle faceplate 82. The jack assembly 81 comprises a wall receptacle printed circuit board 84 ("the wall PCB") having an anterior face 85 (FIG. 7) and a posterior face 90 (FIG. 6). An RJ11 jack 91 wired for voice communications over POTS and an eight-position, eight-conductor jack 92 wired for data communications in accordance with the TIA T568A or TIA T568B standard are mounted to the anterior face 85 of the wall PCB 84. An electrical connector such as an insulation displacement punchdown block 93 is mounted to the posterior face 90 of the wall PCB 84 along with a pair 94 of electrical wall terminals 95, 100, each wall terminal 95, 100 comprising an eight-pin header which may be identical to header 26 shown in FIG. 17. An electrical connector such as a four-conductor jumper 40 is installed on the wall terminal 95, 100 that corresponds with the data communications standard for the particular wall receptacle system 80 in question. If data communications through the wall receptacle system 80 are according to the gigabit standard, the jumper 40 is installed on the left-hand wall terminal 95, thereby activating the TIA T568A/B jack 92 on the jack assembly 81. If data communications through the wall receptacle system 80 are according to the 10/100 standard, thereby also allowing voice communications through the wall receptacle system 80 over POTS, the jumper is installed on the right-hand wall terminal 100 and the RJ11 jack 91 on the jack assembly 91 is activated. The jumper 40 in the wall receptacle system 80 accomplishes activation of the wall terminals 95, 100 in the same manner described above that the jumpers 40 in the patching system 10 accomplish activation of the panel terminals 41, 42.

Figure 8:
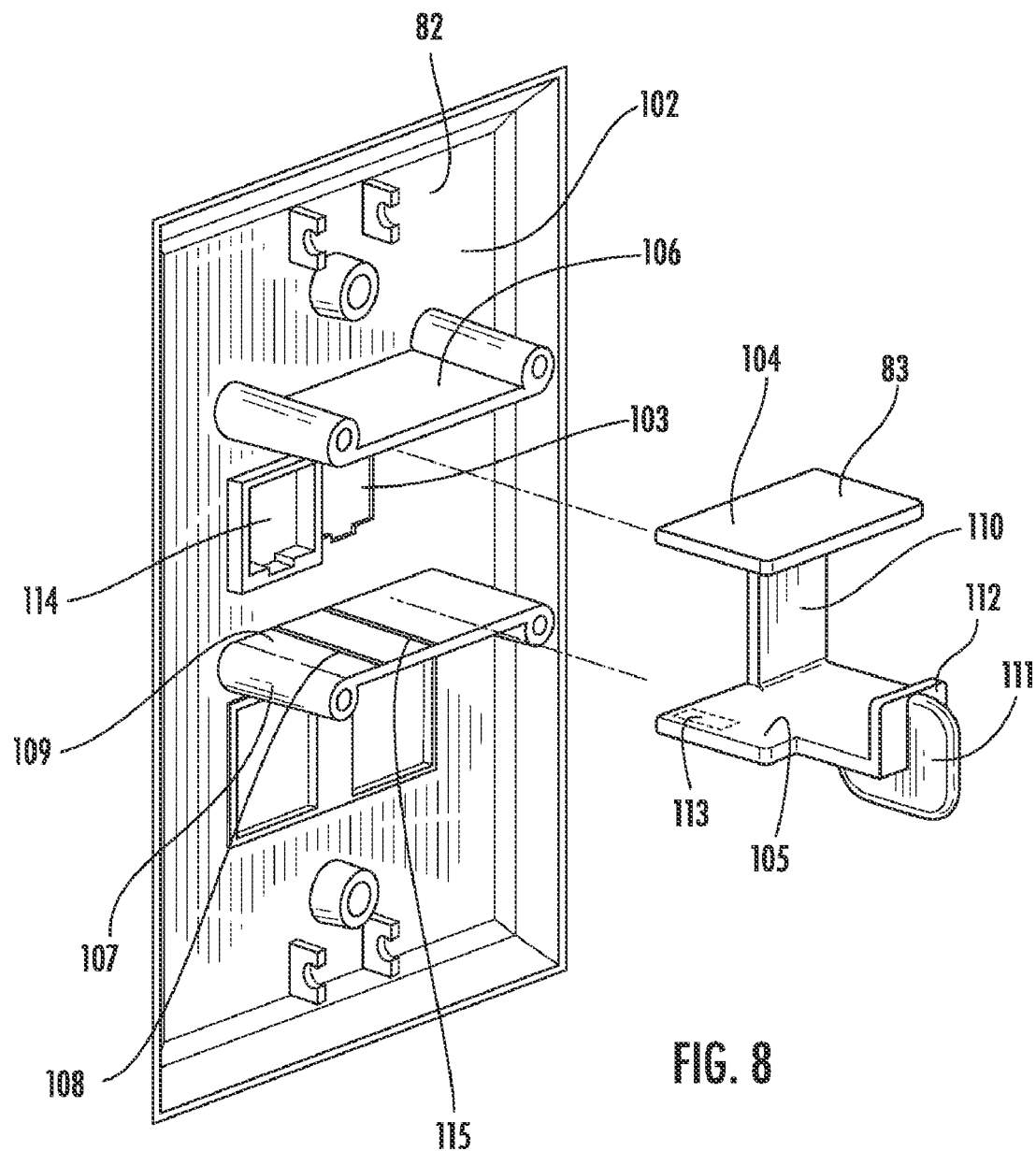
FIG. 8 is a posterior exploded view of the wall receptacle system shown in FIG. 6 with the wall receptacle printed circuit board removed.
Figure 9:
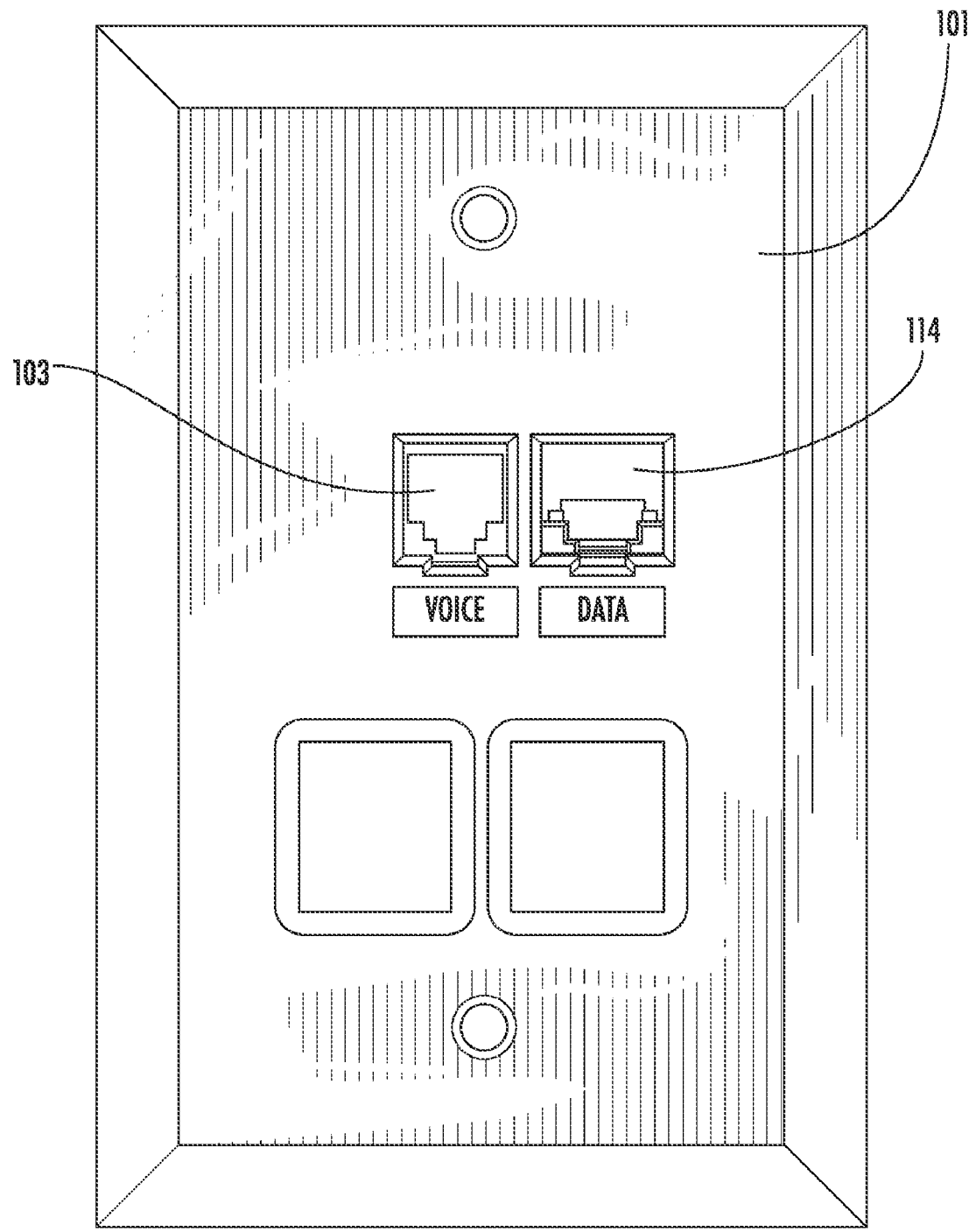
FIG. 9 is an anterior plan view of a wall receptacle faceplate.

Looking at FIG. 8, the wall receptacle faceplate 82 and the shutter 83 of the wall receptacle system 80 are shown. The wall receptacle faceplate 82 comprises anterior and posterior faces 101, 102 and defines openings 103, 114 to provide user access to the RJ11 jack 91 and the TIA T568A/B jack 92 of the jack assembly 81 through the wall receptacle faceplate 82. Upper and lower substantially parallel, spaced-apart shutter guides 106, 107 extend from the posterior face 102 of the wall receptacle faceplate 82. Two substantially parallel grooves 108, 115 are defined in an upper surface 109 of the lower shutter guide 107. The shutter 83 comprises upper and lower opposing major plates 104, 105 connected by a vertical access prevention panel 110. A handle tab 111, a backstop 112, and a positioning fin 113 (in phantom) are integral with the lower major plate 102 of the shutter.

The wall receptacle system 80 may be assembled as follows. The jack assembly 81 is placed between the upper and lower major plates 104, 105 of the shutter 83 such that the jack assembly 81 rests on the lower major plate 105 and between the backstop 112 and vertical access prevention panel 110 of the shutter 83. The shutter 83, with the jack assembly 81 resting thereon, is then placed between the shutter guides 106, 107 of the wall receptacle faceplate 82 with one of the grooves 108, 115 in the lower shutter guide 107 receiving the positioning fin 113 of the shutter 83. The wall PCB 84 of the jack assembly 81 may then be fastened to the shutter guides 106, 107 to complete assembly of the wall receptacle system 80.

The wall receptacle faceplate 82 and the shutter 83 help form a jack selection system as follows. After assembly of the wall receptacle system 80, a user or installer may grasp the shutter 83 by the handle tab 111 and position the shutter 83 such that the vertical access prevention panel 110 of the shutter 83 blocks the opening 103 in the wall receptacle faceplate 82 that is associated with the jack 91, 92 of the jack assembly 81 that is not in use. Thus, if the wall receptacle system 80 is being configured for data communications according to the gigabit standard, the shutter 83 may be moved to the right (when looking at the posterior face 102 of the wall receptacle faceplate 82) until the positioning fin 113 rests in the corresponding groove 115 in the lower shutter guide 107, thereby blocking access to the RJ11 jack 91 and leaving the TIA T568A/B jack 92 accessible through the corresponding opening 114 in the wall receptacle faceplate 82. Or, if the wall receptacle system 80 is being configured for voice communications over POTS and/or data communications according to the 10/100 standard, the shutter 83 may be moved to the left (when looking at the posterior face 102 of the wall receptacle faceplate 82) until the positioning fin 113 rests in the corresponding groove 108 in the lower shutter guide 107, thereby blocking access to the TIA T568A/B jack 92 and leaving the RJ11 jack 91 accessible through the corresponding opening 103 in the wall receptacle faceplate 82. This mechanism creates a clear relationship between the mechanical shutter of the faceplate and the electrical configuration of the overall system.

FIGS. 11-16 show an alternative embodiment of a wall receptacle system. A wall receptacle faceplate 116 includes openings 118 and 120 to provide user access to an RJ-11 jack and TIA T568A/B jack. The shutter 122 is enabled to move in a vertical direction as opposed to the horizontal movement of shutter 83 of wall receptacle system 80. The faceplate 116 includes shutter guide 124 which is received between circuit board mounting studs 126 and 128. The shutter 122 includes plate 130 which is guided by shutter guide 124. The shutter 122 also includes plate 130, portions of which are received within cutout 134 of PCB 136. Cutout 134 also serves as a guide for the shutter 122. Shutter 122 also includes backstop 138, which also serves as a handle so that the user can move the shutter vertically. A pair of fins 140 (only one fin is illustrated) extend from opposite sides of the backstop 138. Jumper 40 will be received on either header 95 or 100. The combination of the jumper 40 and fin 140 will block the full movement of shutter 122 in one direction. However, for the other direction where the header is not received on header 95 or 100, fin 140 will slide between two pins 33 in rows 34 and 35 of the header. This enables the shutter to fully slide in one direction. Thus, by manipulating the shutter 122, access to opening 18 in faceplate 116 will either be permitted or denied because of the positioning of vertical access prevention panel 142, which is a part of shutter 122. Faceplate 116 also includes another shutter guide 125 which is parallel to and spaced from shutter guide 124.

Figure 13:
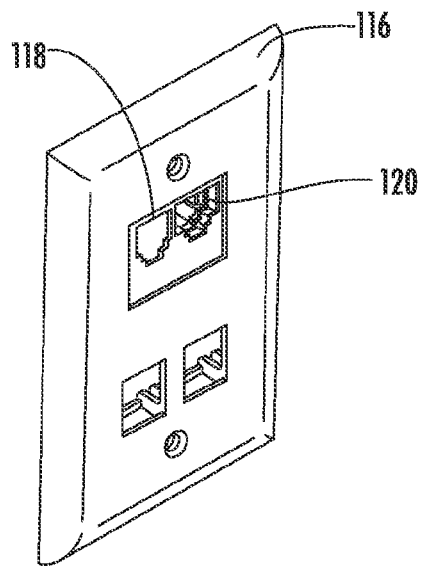
FIG. 13 is an isometric anterior view of the wall receptacle system of FIG. 12.
Figure 14:
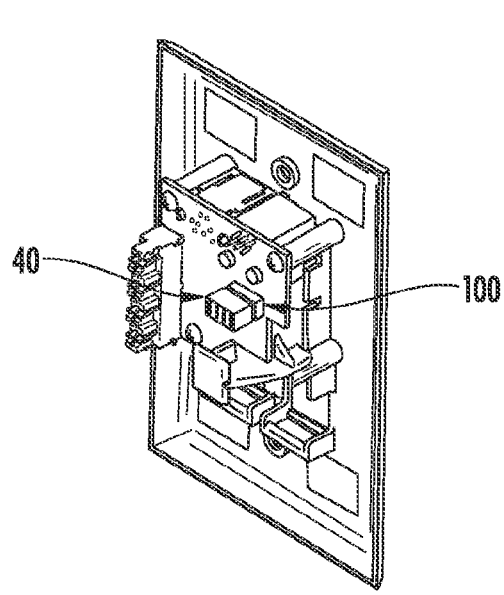
FIG. 14 is a fully assembled isometric posterior view of the wall receptacle system of FIG. 11 in the 10/100 mbps positions.

FIG. 13 shows the front of the faceplate 116 with opening 118 being in the closed position. That is, the shutter has been pushed up so that access prevention panel 142 covers or substantially covers opening 118.

Figure 15:
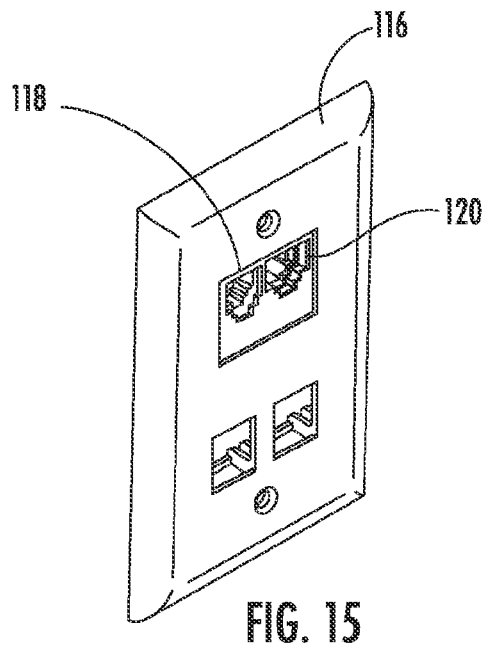
FIG. 15 is an isometric anterior view of the wall receptacle system of FIG. 14.
Figure 16:
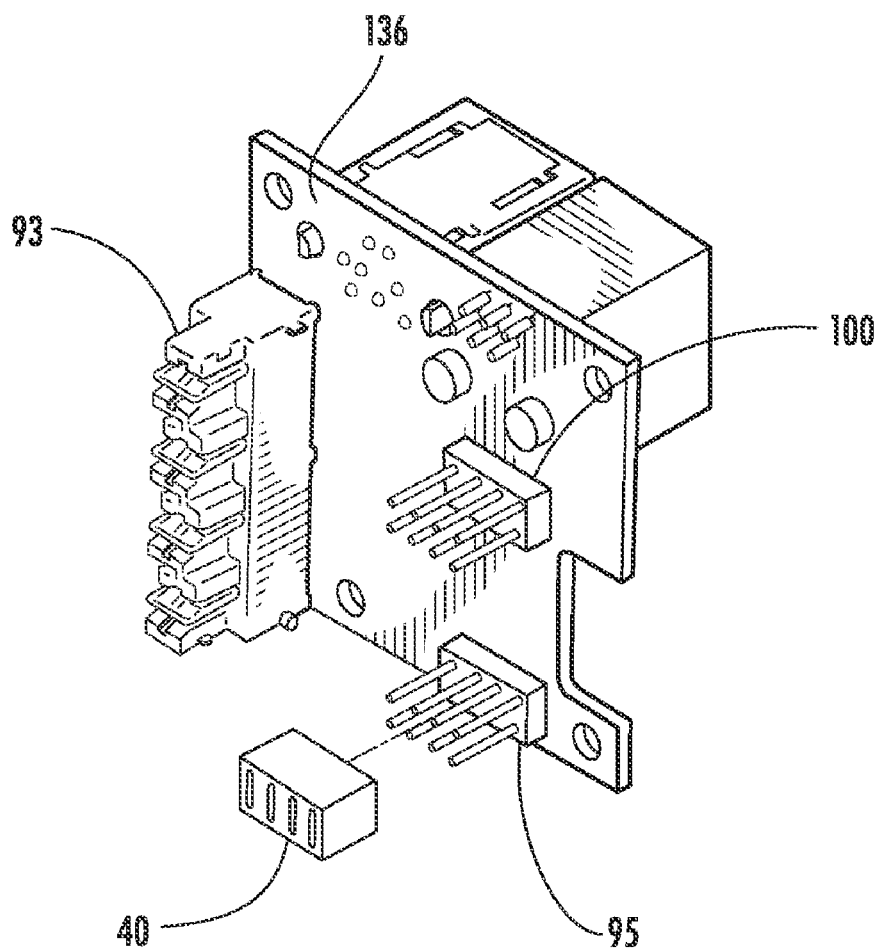
FIG. 16 is a partially exploded anterior isometric view of the printed circuit board of FIG. 11.

FIG. 15 shows the front of faceplate 116 with opening 118 in the open position. That is shutter 122 has been pressed down so that access prevention plate 142 does not cover any portion of opening 118.

The four-conductor jumpers 40 utilized in the illustrated embodiments of the patching system and wall receptacle system of the telecommunications connectivity system of the invention are Part No. MNT-104-BK-G distributed by Samtec, Inc., which has an office in New Albany, Indiana USA and a web site at www.samtec.com ("Samtec"). The eight-pin headers 26 utilized in the illustrated embodiments of the patching system and wall receptacle system of the telecommunications connectivity system of the invention are Part No. MTSW-104-08-G-D-300, also distributed by Samtec.

The telecommunications connectivity system of the present invention enables data communications standards and voice communications availability to be selected on a panel port by panel port basis, as one of ordinary skill in the art can discern from the above description of an embodiment of the invention. As a result, the invention allows multiple wall receptacles carrying various different standards of data communications to be wired from a single patch panel. More specifically, routers and/or modems that provide differing standards of data communications may be connected to the jacks of a single patch panel so long as the terminal selection systems in the patching system and the jumpers and shutters in the associated wall receptacle systems are oriented to enable throughput of the respective standards of data communications selected for the jacks.

For instance, routers and/or modems providing gigabit data communications could be connected to five of the jacks on the patch panel while the remaining seven jacks on the patch panel are connected to routers and/or modems providing 10/100 data communications. With the terminal selection systems in the five gigabit ports configured to enable gigabit communications (in the disclosed embodiment, by orienting the corresponding terminal selectors to have arrows pointing upward) and the terminal selection systems in the seven 10/100 ports configured to enable 10/100 communications (in the disclosed embodiment, by orienting the corresponding terminal selectors to have arrows pointing downward), with the jumpers in the wall receptacle systems oriented accordingly (in the disclosed embodiment, on the left-hand wall terminals for gigabit communications and on the right-hand wall terminals for 10/100 communications), and with the shutters in the wall receptacle systems oriented accordingly (in the disclosed embodiment, to the right for gigabit communications and to the left for 10/100 communications), five gigabit wall receptacles and seven 10/100 wall receptacles may be wired from the single patch panel. In this way, rooms requiring gigabit communications may receive gigabit receptacles and rooms only requiring 10/100 communications and/or requiring voice communications may receive 10/100 receptacles. Or a single room requiring both gigabit and voice communications may receive a combination of gigabit and 10/100 receptacles.

The subject invention provides dual access enabling one to wire a building for both gigabit and 10/100 communication service using a single cabling system. In the disclosed embodiment of the invention, the cabling (not shown) between the patching system 10 and the wall receptacle system 80 is eight-conductor twisted-pair copper cabling that complies with Category 5, Category 5e, and/or Category 6 specifications. However, as cabling standards improve to accommodate increased data communications rates, improved cabling may be employed without departing from the scope of the invention.

The patch panel could be configured to provide throughput of any mix of gigabit and 10/100 signals necessary to accommodate the signals from the available routers and/or modems (e.g., two gigabit ports and ten 10/100 ports, eight gigabit ports and four 10/100 ports, etc.). If more than twelve ports are needed, multiple patch panels may be utilized; in such a case, still only one voice communications signal over POTS would be necessary, as the patch panels could be daisy-chained together as described above to provide throughput of a single voice signal. However, if multiple voice communications signals over POTS are desired, each patch panel can carry two different voice signals (one through each of the two panel PCBs on the patch panel) and additional patch panels may be added to carry additional voice signals as desired. Furthermore, the panel module may be modified to include multiple POTS services throughout the system.

As the twelve-port patch panel described herein is merely one embodiment of the patch panel of the telecommunications connectivity system of the invention, patch panels with varying numbers of ports may be utilized in the telecommunications connectivity system without departing from the scope of the invention. In addition, other data standard selection hardware beyond that utilized in the disclosed embodiment of the invention (i.e., hardware other than the terminal selectors, four-conductor jumpers, eight-pin headers, and shutters) may be employed without departing from the scope of the invention. Finally, as data communications standards and the associated hardware continue to provide higher and higher bit rates (e.g., 10 gigabit), the hardware of the invention may be modified to accommodate such rates without departing from the scope of the invention.

A telecommunications connectivity system and associated patch panel mounting system are described above. Various details of the invention may be changed without departing from its scope. Furthermore, the foregoing description of embodiments of the invention and the best mode for practicing the invention are provided for the purpose of illustration only and not for the purpose of limitation—the invention being defined by the claims.

The invention claimed is:

1. A telecommunications connectivity system, comprising:

a patch panel comprising a plurality of ports, each port comprising first and second electrical terminals, the first electrical terminal enabling at least one data communications standard not enabled by the second electrical terminal;

a terminal selection system comprising a terminal selector that houses an electrical connector, wherein the terminal selector may be installed in one of the ports such that the electrical connector connects to either the first or second electrical terminals, as preselected; and a wall receptacle system electrically connected to each of the ports, the wall receptacle system comprising first and second jacks, the first jack enabling at least one data communications standard not enabled by the second jack;

the wall receptacle system further comprises a jack selection system, the jack selection system comprising:

a wall receptacle faceplate defining first and second openings, the first opening configured to provide access to first jack and the second opening configured to provide access to the second jack; and a shutter for blocking either the first or second opening in the wall receptacle faceplate, thereby blocking access to either the first jack or the second jack.

2. A telecommunications connectivity system as set forth in claim 1, wherein the wall receptacle system includes:

a printed circuit board comprising anterior and posterior faces;

first and second jacks mounted on the anterior face of the printed circuit board, the first jack enabling at least one data communications standard not enabled by the second jack;

a first electrical connector mounted on the posterior face of the printed circuit board;

first and second electrical terminals mounted on the posterior face of the printed circuit board, the first electrical terminal being electrically connected to the first jack and the second electrical terminal being electrically connected to the second jack; and a jack selection system comprising a second electrical connector, the second electrical connector being installed on either the first or second electrical terminal to electrically connect the first electrical connector to either the first jack or the second jack.

3. A telecommunications connectivity system according to claim 2, wherein the first jack enables data communications according to the gigabit standard and the second jack enables data communications according to the 10/100 standard and not the gigabit standard.

4. A telecommunications connectivity system according to claim 3, wherein the first jack is an eight-conductor, eight-position jack configured in accordance with the TIA T568A or TIA T568B standard and the second jack is an RJ11 jack.

5. A telecommunications connectivity system according to claim 2, wherein the first and second electrical terminals are headers.

6. A telecommunications connectivity system according to claim 2, wherein the first electrical connector is an insulation displacement punchdown block and the second electrical connector is a jumper.

7. A telecommunications connectivity system according to claim 1 whereby the mechanical exposure of the electrical connector has a clear relationship with the electrical configuration of the selectable system.

* * * * *